Nov. 15, 1949   G. A. STONESTREET ET AL   2,488,344
DISTRIBUTING AND CONVEYING OF PIECES
OF EXTRUDED PLASTIC MATERIALS
Filed July 24, 1945   5 Sheets-Sheet 3

INVENTORS
GEORGE A. STONESTREET
HERBERT R. SAIT
BY
ATTORNEYS

Nov. 15, 1949 G. A. STONESTREET ET AL 2,488,344
DISTRIBUTING AND CONVEYING OF PIECES
OF EXTRUDED PLASTIC MATERIALS
Filed July 24, 1945 5 Sheets-Sheet 5

INVENTORS.
GEORGE ALEC STONESTREET
HERBERT RICHARD SAIT
BY
THEIR ATTORNEY

Patented Nov. 15, 1949

2,488,344

UNITED STATES PATENT OFFICE 2,488,344

DISTRIBUTING AND CONVEYING OF PIECES OF EXTRUDED PLASTIC MATERIALS

George Alec Stonestreet, Richmond, and Herbert Richard Sait, Northolt, England, assignors to T. Wall & Sons Limited, London, England, a company of Great Britain Application July 24, 1945, Serial No. 606,770
In Great Britain July 26, 1944

19 Claims. (Cl. 25—105)

This invention consists of improvements in the distribution and conveying of pieces of extruded plastic materials.

The expression "plastic material" includes such soft solids as butter, margarine, fats, lard, shortenings, dough, soap, wax, ice cream, marzipan, chocolate, brick clay, tile clay, putty and paste or viscous substances which can be extruded at normal or at higher or lower temperatures. It frequently happens that an extruded body or stream has to be cut or formed into separate pieces and then the formed pieces receive further treatment such as drying or such as heat treatment (baking, firing or cooking) or such as cold treatment (chilling or freezing) or such as setting and hardening. It will be appreciated that if a plastic material extruded from a single nozzle be cut or formed into separate pieces which are deposited in series on a moving conveyor so that the pieces move away in single file, it would require a very long conveyor if the further treatment is to take place on the conveyor.

One object of our invention is to provide a relatively short conveyor system to which the cut-off pieces can be delivered at a rapid rate and which is constructed to support a large number of pieces whereby each piece may be subjected to a further treatment for an appreciable length of time.

In accordance with this invention, we employ a method of distributing and conveying pieces of extruded material which includes the steps of reciprocating transversely to the direction of extrusion, the extrusion head which extrudes and forms the pieces and of depositing the pieces in transverse lines on a conveyor movable in the direction of extrusion so that a wide conveyor may be well filled with pieces which then receive further treatment on the conveyor.

Each transverse movement of the extrusion head may be a steady or continuous movement or it may be an intermittent or step-by-step movement.

The movement of the receiving conveyor is preferably an intermittent movement, e. g. the conveyor remains still while receiving a transverse row of deposited pieces whereupon the conveyor is moved forward one step to allow for the deposit of a fresh transverse row of deposited pieces. The movement of the receiving conveyor may be continuous, and in that event the successive transverse rows are deposited in zig-zag formation on the moving conveyor.

The present invention may be used in conjunction with the slicing mechanism forming the subject matter of an application of George Hazell Searle and William Denis Lucking Webb, Serial No. 606,870, filed July 24, 1945.

The extruded material may be sliced by travelling wires as described in that specification, but it will be understood that the present invention is applicable to any mechanism in which the extruded material is cut or formed into a succession of separate pieces.

Other objects of this invention will be apparent from the following description of a preferred embodiment of this invention with reference to the accompanying drawings, in which, Figure 1 is a side elevation, partly in section on the line 1—1 of Figure 2, of that part of the apparatus where the material is extruded, sliced and deposited on a conveyor;

Figure 1:
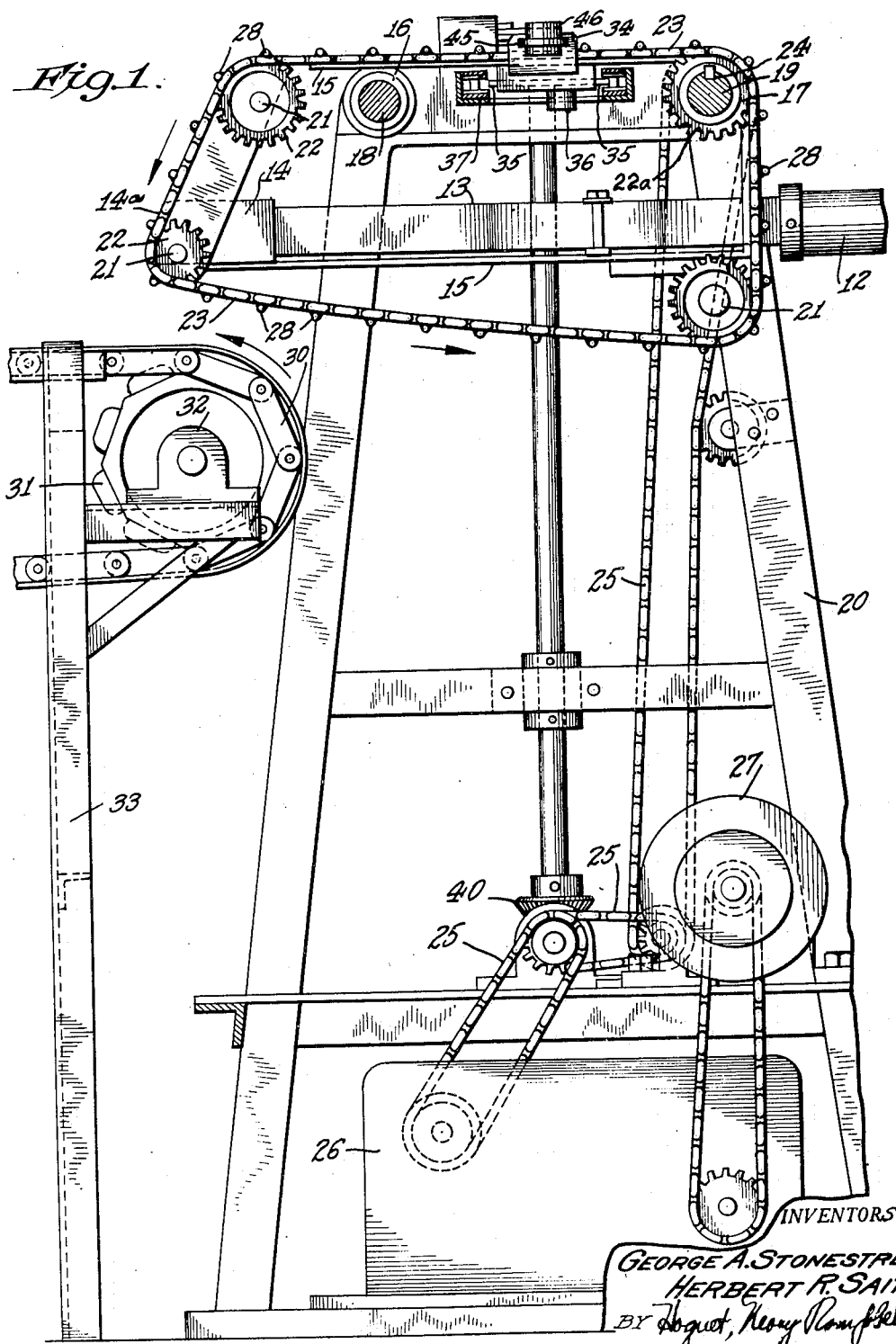

The tube 12 conveying the plastic material is flexible and any suitable means may be employed for forcing the material through the tube under pressure at a desired speed. The flexible tube 12 is coupled to a rigid tube 13 provided with a water-jacketed nozzle 14, the tube 13 and nozzle 14 being mounted on an extrusion head or carriage 15 provided with sleeves 16 and 17 which slide on cylindrical guide bars 18 and 19 mounted in the machine frame 20 and extending transversely to the direction of extrusion.

Suitably journalled in the head or carriage 15 are transversely extending spindles 21 on which are secured sprocket wheels 22 over which pass two endless chains 23. The transverse guide bar 19 constitutes a shaft rotatably journalled in the frame 20 and has a groove 24 in which slides a spline carried by the sleeve 17 which carries the sprocket wheels 22a which drive the chains 23. The shaft 19 is driven through chains 25 from a continuously variable change speed gear box 26 and motor 27.

Secured between the chains 23 are horizontal cutting wires 28 arranged at spaced intervals, and it is to be noticed that the downward cutting path of the cutting wires 28 in front of the nozzle 14 is inclined to the vertical. The angle of inclination and the speed of the cutting wires are chosen in relation to the speed of extrusion so that although the path of the cutting wire is inclined to the vertical, the actual cut face of the severed slice of material is normal to the upper and lower faces of the extruded material. Conveniently, the outlet face 14a of the nozzle 14 is inclined to the vertical at the same angle and the cutting wires 28 slide over the face of the nozzle 14 when cutting the extruded material.

An endless conveyor 29 moving in the direction of extrusion is here shown as operated by chains 30 passing over sprocket wheels 31 carried by a shaft rotatably mounted in bearings 32 in a framework 33. As a cutting wire 28 is forced through the extruded material, it not only cuts off one slice or piece but at the end of the cut, before the cut is quite finished, the slice or piece falls forward and at the same time hinges about the small remaining uncut portion. Thus, by placing the conveyor 29 at a suitable distance below the extrusion nozzle 14, it is possible to cause the cut slice or piece to fall on the belt with its newly cut face uppermost.

Figure 2:
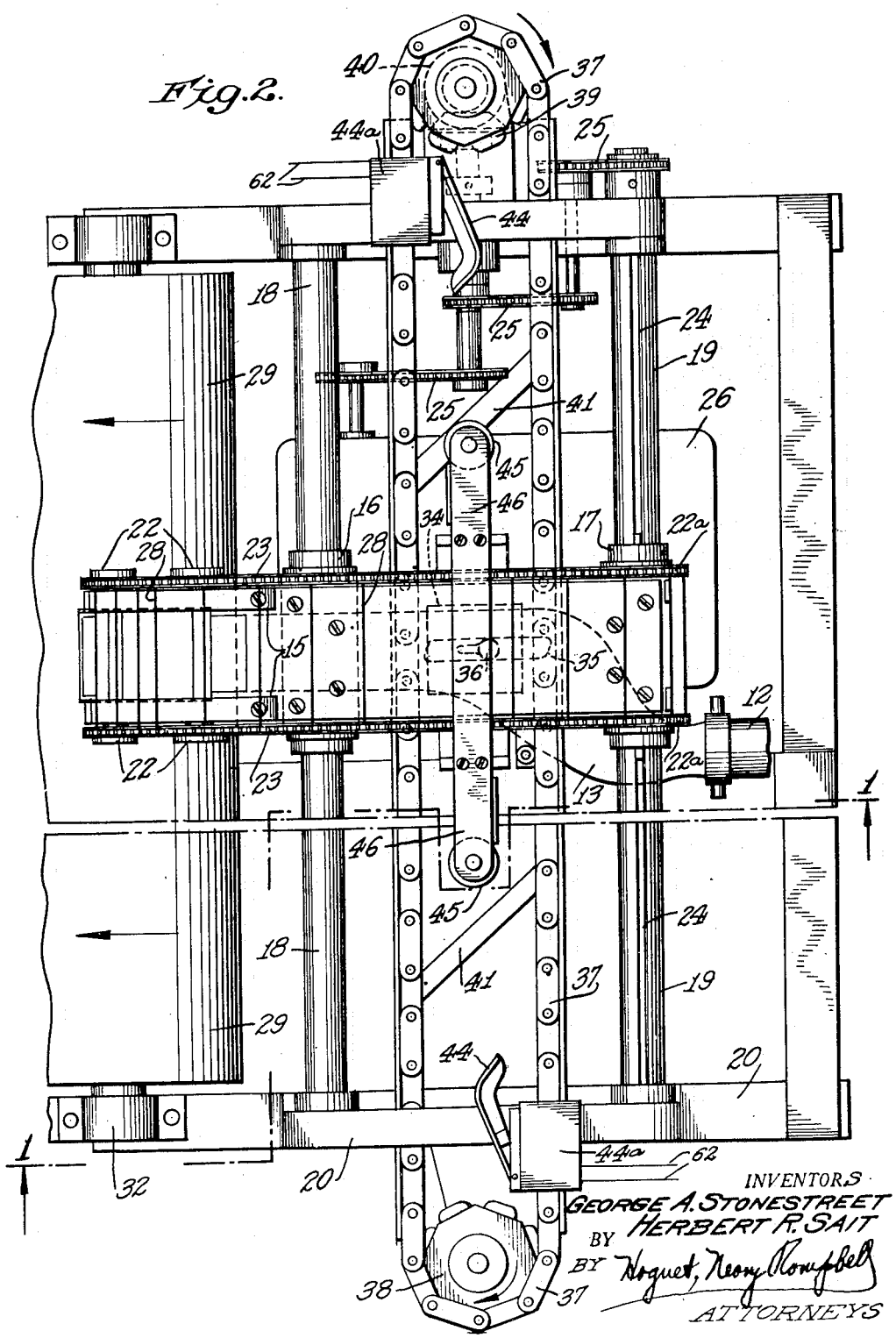
Figure 2 is a plan view of the same part.

The drawings show the mechanism for imparting reciprocating transverse movement to the extrusion head or carriage 15 disclosed in said application referred to. The head or carriage 15 carries a bracket 34 in which a finger 35 is mounted to slide transversely to the right and left, Figures 1, 2 and 3. The finger is provided with a downwardly projecting roller 36 and the finger 35 can engage at one end or at the other end in the links of a transverse endless horizontal chain 37 supported on horizontal sprocket wheels 38 and 39, the latter of which is driven through a bevel gear 40 from the change gear box 26 and motor 27.

Near each side of the frame 20 is a horizontal flat bar 41 lying in the path of the roller 36 and inclined to that path at an angle of about 45° so that when the roller 36 just at the end of its transverse movement strikes a bar 41, the roller is shifted either fore or aft and moves the finger 35 out of driving engagement with the strand of the chain 37 on one side and into engagement with the strand of the chain on the other side so as to reverse the movement of the extrusion head or carriage 15.

The operation of this part of the apparatus is as follows: Assuming that the extrusion head or carriage 15 is at one extremity of its travel, the plastic material is being extruded at a uniform speed through the nozzle 14 and the cutting wire 28 slices off a piece which falls on the conveyor 29. The chain 37 through the finger 35 propels the extrusion head 15 transversely and the cut pieces are thus deposited in a row right across the conveyor 29.

The transverse section of the nozzle may take any form, cylindrical, polygonal, etc., but assuming that it is rectangular, then the cut pieces are rectangular slabs and owing to the angle of movement of the cutting wires 28 the cut faces of these slabs are normal to the extruded faces for a predetermined ratio of the speed of extrusion and the rate of travel of the cutting wires.

Figure 3:
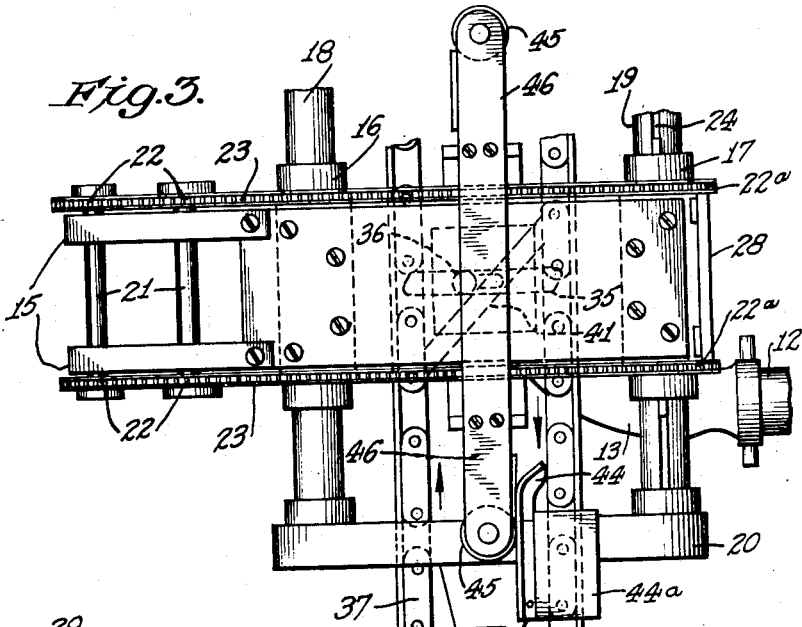
Figure 3 is a plan view of the extrusion head when at one end of its transverse movement.
Figure 4:
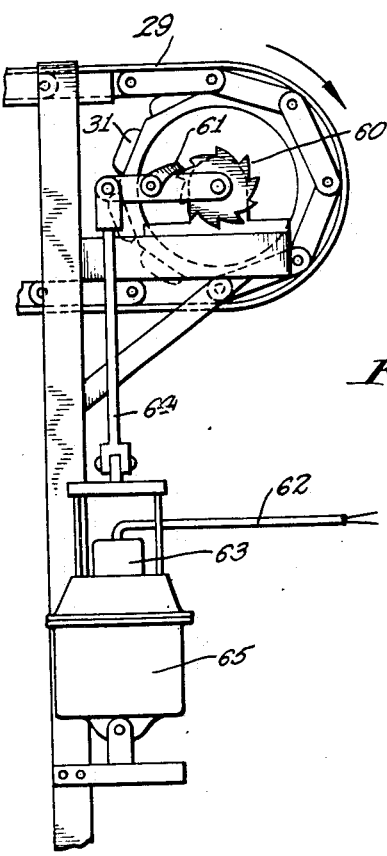
Figure 4 is a side elevation showing a mechanism for giving the conveyor an intermittent motion.

Turning now to the conveyor 29, in the arrangement shown, a single conveyor is used and it is intended that the movement of the conveyor shall be intermittent, the conveyor being at rest while a row of pieces is being deposited, and the conveyor being moved forward by one step when the row is completed. For this purpose the conveyor conveniently at its discharge end, which is shown in Figure 4, has an intermittent feeding mechanism, in which a driving sprocket 31 is secured to a ratchet wheel 60 engaged by a reciprocating pawl 61 which receives the necessary feed motion each time the extrusion head completes one transverse movement. The pawl is preferably actuated by an electro-hydraulic device which is energized over a circuit completed at the extrusion head or carriage by either of two enclosed switches 44a (Figure 2), operated by spring-controlled switch levers 44. The connections to the electro-hydraulic device are shown at 62, and connect to the electric motor 63 of the device. The casing 65 contains an impeller which drives liquid beneath a piston to raise or lower the connecting rod 64 and so operate the pawl 61 and move the conveyor 29 intermittently. An electro-hydraulic device of this kind is described in British patent specification 363,137, and being well known need not be described in fuller detail in this specification. The levers 44 have vertical faces inclined to the direction of movement of the extrusion head 15 and lying in the path of rollers 45 carried at the ends of a transverse bar 46 mounted on the extrusion head 15, the arrangement being such that when the head 15 reaches either end of its transverse movement, a roller 45 engages a switch lever 44 and moves it to the closed position as shown in Figure 3 for a short time during which the conveyor 29 is moved forward by one step, due to closing of the switches 44a connected to the motor 63 (Figure 4) through leads 62.

The separate blocks or pieces of the extruded material may be formed or cut by other means than that shown.

The transverse movement of the extrusion head may be intermittent or step-by-step. Thus if a group of parallel receiving conveyors be used, the extrusion head may remain above one conveyor while it receives a definite number of pieces in series whereupon that conveyor is stopped, then the extrusion head may be shifted laterally into coincidence with the next conveyor which receives a similar series of pieces, and so on.

Figure 5:
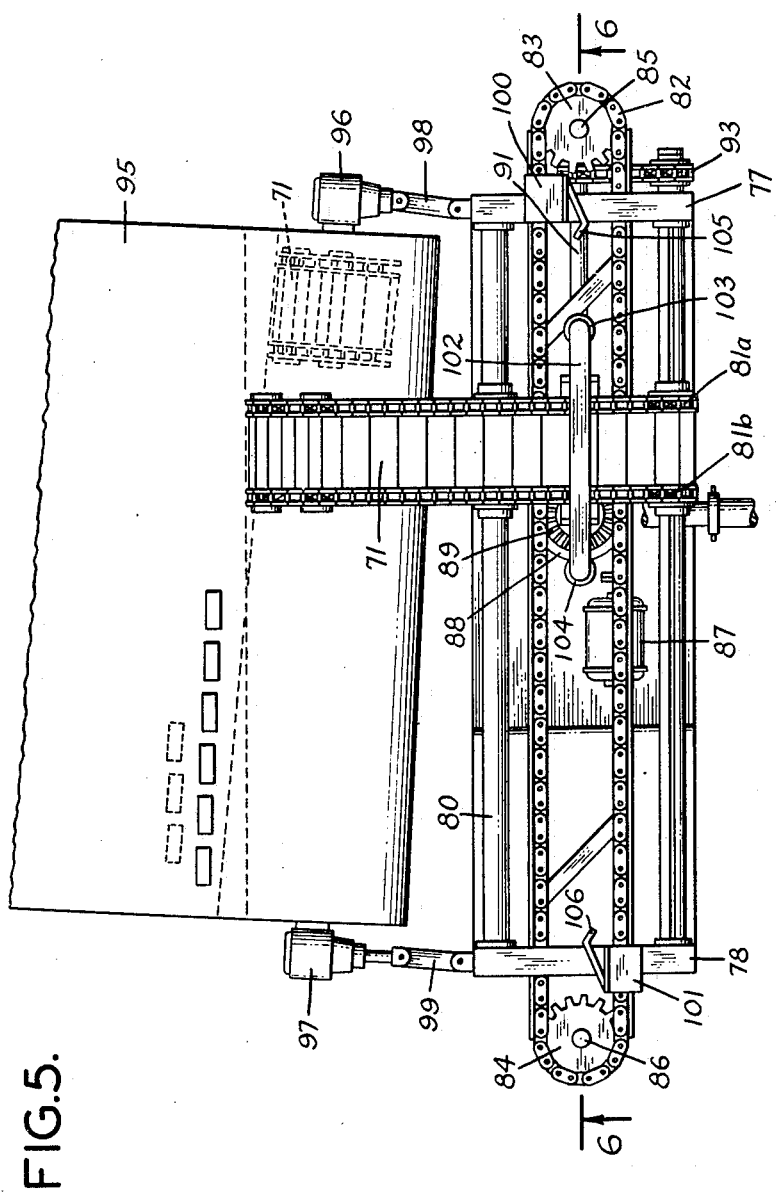
Figure 5 is a plan view of a modified form of extruding and distributing device and showing a portion of the conveyor for receiving the distributed articles.
Figure 6:
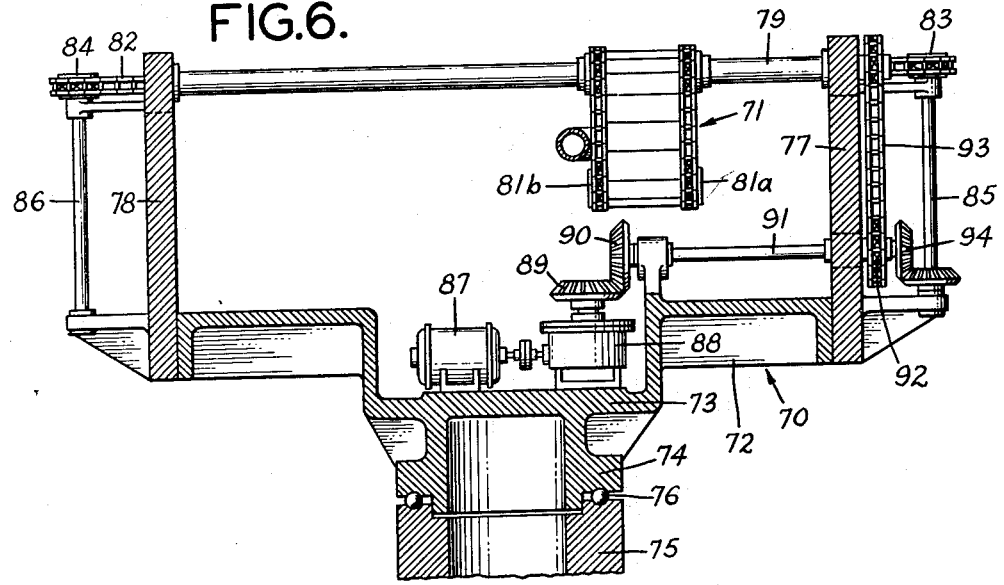
Figure 6 is a view in vertical section taken on line 6—6 of Figure 5.
Figure 7:
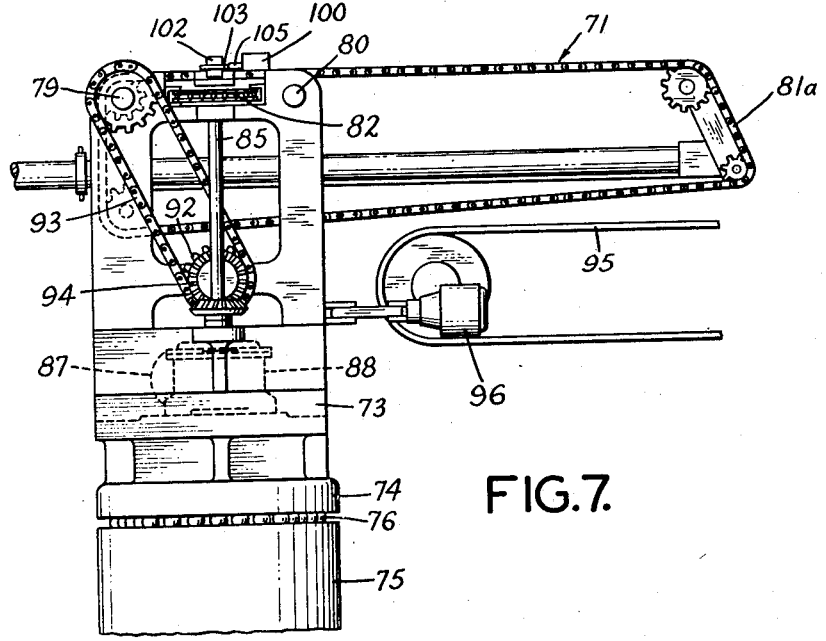
Figure 7 is an end view of the device shown in Figures 5 and 6.

A wide conveyor like 29 may be moved very slowly but continuously and the extrusion head may be movable on guides such as 17 carried in a chassis pivoted on a central vertical axis so that the chassis can be slewed or tilted in the horizontal plane to such an extent that the row of cut pieces is deposited across the conveyor at right angles to the direction of travel and by this means the conveyor surface may be well filled. A device of this type is shown in Figures 5 to 7 of the drawings.

In this type of extruding device, a frame 70 is provided for receiving the distributor 71 which is like the distributor described above. The frame 70 is provided with a bottom plate 72 having a dropped center portion 73 provided with a downwardly extending bearing member 74 which is supported rotatably on a centrally located standard 75. Suitable bearings, such as ball bearings 76, may be interposed between the bearing element and the standard 75 to facilitate oscillation of the frame 70 about a vertical axis. The frame 70 also is provided with a pair of end frame elements 77 and 78 which carry a pair of guide rods 79 and 80 upon which the distributor 71 is supported for movement lengthwise thereof. The guide rod 79 is rotatably mounted in the end frames 77 and 78 for rotation therein to drive the chains 81a and 81b carrying the cutting elements for severing the plastic material.

Reciprocation of the distributor 71 is produced by means of the chain 82 which is supported by means of the sprockets 83 and 84 mounted on the shafts 85 and 86 carried by the frame 70. The various movable elements described above are driven by means of a motor 87 mounted in the dropped portion 73 of the frame and driving a reduction gear 88. The output of the reduction gear 88 is connected by means of the bevel gears 89 and 90 to the shaft 91 which carries a sprocket 92 for driving the shaft 79 by means of a chain 93. The shaft 91 is also provided with a bevel gear 94 for driving the shaft 85 which carries the sprocket 83. The mechanism for reversing the direction of travel of the distributor 71 is similar to that described previously.

In order to swivel the distributor 71 so as to deposit the severed plastic blocks substantially perpendicular to the direction of travel of the conveyor belt 95, a pair of solenoids 96 and 97 are supported on opposite ends of fixed supporting elements for the conveyor 95 and are connected by means of the links 98 and 99 to the ends of the frame 70. These solenoids 96 and 97 are energized alternately by closing switches 100 and 101 alternately by movement of the distributor. As best shown in Figure 5, the distributor is provided with a cross bar 102 having rollers 103 and 104 at its opposite ends for engagement with the L-shaped arms 105 and 106, respectively, on the switches 100 and 101. Thus, when the roller 103 engages the switch arm 105, the solenoid 96 is energized and the link 98 is thrust downwardly, as viewed in Figure 5, to rotate the frame 70 in a clockwise direction to the dotted line position shown in Figure 5. At the same time, the direction of movement of the distributor 71 is reversed, and, when it reaches the left-hand edge of the conveyor 95, the switch 101 is closed and the solenoid 97 is energized to project the link 99 and thus rotate the frame 70 to the position shown in Figure 5. Such angular inclination of the distributor 70 with respect to the axis of the conveyor causes the successively severed blocks to be deposited at an angle across the conveyor which is substantially sufficient to compensate for the continuous movement or travel of the conveyor belt 95.

The pieces on the conveyor may be subjected to further treatment. Thus clay blocks or slabs may pass into a furnace or drying chamber; certain foodstuffs, pastes, plastics and the like may pass into a chamber for heat treatment; other extruded pieces like ice cream briquettes or blocks may pass into a refrigerating chamber.

This invention is concerned with the distribution and conveying of the pieces of extruded material and with the co-operating features of the apparatus disclosed.

While we have shown and described preferred embodiments of our invention, it is to be understood that this has been done for purposes of disclosure and is not to be considered as limiting, and that we reserve the right to all such changes and modifications as fall within the principles of this invention and the scope of the appended claims.

We claim:

1. A mechanism for forming, distributing and conveying blocks of plastic material which comprises a movable distributor comprising an extrusion nozzle, means for extruding plastic material through said nozzle, and means adjacent to the end of said nozzle and movable transversely thereof at an angle to the axis of said nozzle for cutting blocks from said plastic material extruded through said nozzle, a conveyor disposed a short distance beneath said distributor to receive said blocks immediately after cutting, and means for moving said distributor back and forth across said conveyor.

2. A mechanism for forming, distributing and conveying blocks of plastic material having a well defined shape which comprises in combination, a distributor comprising an extrusion nozzle and means for cutting blocks of well defined shape from plastic material extruded through said nozzle, a conveyor disposed a short distance beneath said distributor to receive said blocks immediately after cutting, means for moving said conveyor intermittently and means for moving said distributor across said conveyor during each period of rest of said conveyor.

3. A mechanism for forming, distributing and conveying blocks of plastic material which comprises a transversely movable distributor comprising an extrusion nozzle and means for cutting blocks of uniform shape from plastic material extruded through said nozzle, a conveyor disposed a short distance beneath said distributor to receive said blocks immediately after cutting, an endless flexible member having opposite substantially parallel flights extending transvrsely of said conveyor, means for driving said flexible member in one direction, and means for alternately connecting said distributor to the opposite flights of said member to move said distributor back and forth transversely of said conveyor.

4. A mechanism for forming, distributing and conveying blocks of plastic material which comprises a movable distributor including an extrusion nozzle and means for cutting blocks of uniform shape from plastic material extruded through said nozzle, a conveyor disposed a short distance beneath said distributor to receive said blocks immediately after cutting, an endless chain having opposite substantially parallel flights extending transversely of said conveyor, means for driving said chain in one direction and means on said distributor for alternately engaging in the links of the opposite flights of said chain adjacent to opposite edges of said conveyor to move said distributor back and forth transversely of said conveyor.

5. A mechanism for forming, distributing and conveying blocks of plastic material which comprises a movable distributor comprising an extrusion nozzle, means for forcing plastic material through said nozzle, means for cutting blocks of uniform shape from plastic material extruded through said nozzle, a conveyor disposed a short distance beneath said distributor to receive said blocks immediately after cutting, an endless chain having opposite substantially parallel flights extending transversely of said conveyor, means for driving said chain in one direction, a slidable rod on said distributor adapted to engage in the links of the opposite flights of said chain to move said distributor transversely of said conveyor, and means operable at the end of a transverse movement of said distributor for sliding said rod to disconnect said rod from one flight of said chain and connect it to the other flight of said chain.

6. A mechanism for forming, distributing and conveying blocks of plastic material which comprises a movable distributor comprising a nozzle for extruding plastic material and means for cutting blocks of uniform shape from the plastic material extruded through said nozzle, a conveyor disposed a short distance beneath said distributor to receive said blocks immediately after cutting, means for moving said distributor back and forth across said conveyor, and control means for causing said conveyor to be moved ahead one step at the end of each transverse movement of said distributor.

7. In a distributing and conveying mechanism, the combination of a conveyor, a transversely movable distributor, an endless chain, a slidable rod on said distributor adapted to engage in the links of the opposite strands of said chain, and means operable at the end of a transverse movement of said distributor for sliding said rod to disconnect said rod from one strand of said chain and connect it to the other strand of said chain, said means comprising spaced parallel bars extending at an acute angle with respect to the direction of movement of said distributor and a cooperating means carried by said rod for shifting said rod.

8. A mechanism for forming, distributing and conveying blocks of plastic material which comprises a conveyor, a movable distributor comprising an extrusion nozzle and means for cutting blocks of uniform shape from plastic material extruded through said nozzle, a conveyor disposed a short distance beneatth said distributor to receive such blocks immediately after cutting, means for moving said distributor back and forth across said conveyor between outer limits adjacent the side edges of said conveyor and means operated by said distributor as it reaches its outer limits of movement for moving said conveyor ahead one step, said means comprising movable switch arms and means on said distributor for operating said switch arms.

9. In a distributing and conveying mechanism, the combination of an intermittently moving conveyor, a distributor comprising an extrusion nozzle and means for slicing off pieces from the material extruded through said nozzle, and means for moving said distributor back and forth across said conveyor and alternately in opposite directions during successive periods of rest of said conveyor.

10. A method of distributing and conveying pieces of extruded material which includes the steps of reciprocating transversely to the direction of extrusion the extrusion head which extrudes the material, cutting the material in pieces, and depositing the pieces in transverse lines on a conveyor or on conveyors movable in the direction of extrusion so that a wide conveyor or group of parallel conveyors may be well filled with pieces.

11. A method as claimed in claim 10 in which the extrusion head is reciprocated transversely with a steady or continuous movement.

12. A method as claimed in claim 10 in which the extrusion head is reciprocated transversely with an intermittent or step-by-step movements.

13. A method as claimed in claim 10 in which the receiving conveyor or conveyors is moved intermittently and is stationary while receiving a transverse row of deposited pieces.

14. A method as claimed in claim 10 in which the receiving conveyor is moved continuously.

15. A method as claimed in claim 10 in which the receiving conveyor is moved continuously and the successive transverse rows of pieces are deposited in zig-zag formation on the moving conveyor.

16. A method as claimed in claim 10 in which the receiving conveyor is moved continuously and the reciprocating extrusion head and the means for cutting the material are slewed or tilted in a plane parallel with the conveyor surface so that during each transverse movement of the extrusion head the pieces are deposited on the conveyor in a line which is normal to the direction of extrusion.

17. An apparatus for distributing and conveying of pieces of extruded plastic material comprising in combination a fixed framework, transverse guides in said framework, a carriage having an extrusion head and means for cutting material extruded from said head slidably mounted on said guides for movement transverse to the direction of extrusion, a substantially horizontal endless chain on said frame-work having opposite flights alternately engageable with said carriage to reciprocate the latter in said guides, and an endless conveyor movable in the direction of extrusion and arranged to receive the pieces of said extruded material in transverse lines.

18. An apparatus as claimed in claim 17 comprising a ratchet and pawl device for moving said conveyor intermittently, an electro-hydraulic system including switches for actuating said pawl and ratchet device, said switches being operated at the ends of the reciprocating movements of said carriage to move the conveyor forward one step at each end of the transverse movement of the carriage.

19. An apparatus as claimed in claim 17 comprising means for moving said conveyor continuously, and means for slewing or tilting said carriage in a horizontal plane to such an extent that the row of pieces is deposited across the conveyor at right angles to the direction of travel of said conveyor.

GEORGE ALEC STONESTREET.
HERBERT RICHARD SAIT.

REFERENCES CITED

The following references are of record in the file of this patent:

UNITED STATES PATENTS

| Number | Name | Date |
|---|---|---|
| 520,827 | Koss | June 5, 1894 |
| 1,316,160 | Johnson | Sept. 16, 1919 |
| 1,468,896 | Barker | Sept. 25, 1923 |
| 1,487,001 | Williams | Mar. 18, 1924 |
| 2,215,435 | Hale | Sept. 17, 1940 |
| 2,383,989 | Pilcher | Sept. 4, 1945 |